United States Patent [19]

Fox

[11] Patent Number: 4,757,718
[45] Date of Patent: Jul. 19, 1988

[54] DE-ICER FOR A TRANSDUCER ASSEMBLY
[75] Inventor: Clarence D. Fox, Decatur, Ill.
[73] Assignee: Borg-Warner Automotive, Inc., Troy, Mich.
[21] Appl. No.: 29,503
[22] Filed: Mar. 23, 1987
[51] Int. Cl.$^4$ ............................................. G01L 7/00
[52] U.S. Cl. ...................................... 73/714; 73/722; 237/80
[58] Field of Search ...................... 73/118.1, 116, 115, 73/714, 35, 722; 123/494, 489, 570, 568; 237/80; 261/DIG. 20

[56] References Cited

U.S. PATENT DOCUMENTS

| | | | |
|---|---|---|---|
| 3,385,112 | 5/1968 | Pruitt et al. | 73/116 |
| 3,917,454 | 11/1975 | Clark | 73/23 |
| 4,555,952 | 6/1984 | Jenkins | 73/861.61 |
| 4,643,652 | 2/1987 | Eberhardt | 60/310 |
| 4,653,300 | 3/1987 | Crout et al. | 364/476 |

Primary Examiner—Stewart J. Levy
Assistant Examiner—Robert R. Raevis
Attorney, Agent, or Firm—John W. Harbst; James A. Geppert

[57] ABSTRACT

A transducer assembly having a housing provided with an inlet port which is adapted for communication with an exhaust passage of an internal combustion engine. The housing includes at least one pressure chamber to which the inlet port opens and an apparatus for detecting pressure in the chamber. The inlet passage to the chamber being subject to ice blockage when ambient temperatures fall below freezing. As such, an apparatus which extends at least partially through the inlet passage is provided to prevent complete ice blockage of the inlet passage whereby assuring proper performance of the transducer assembly.

25 Claims, 2 Drawing Sheets

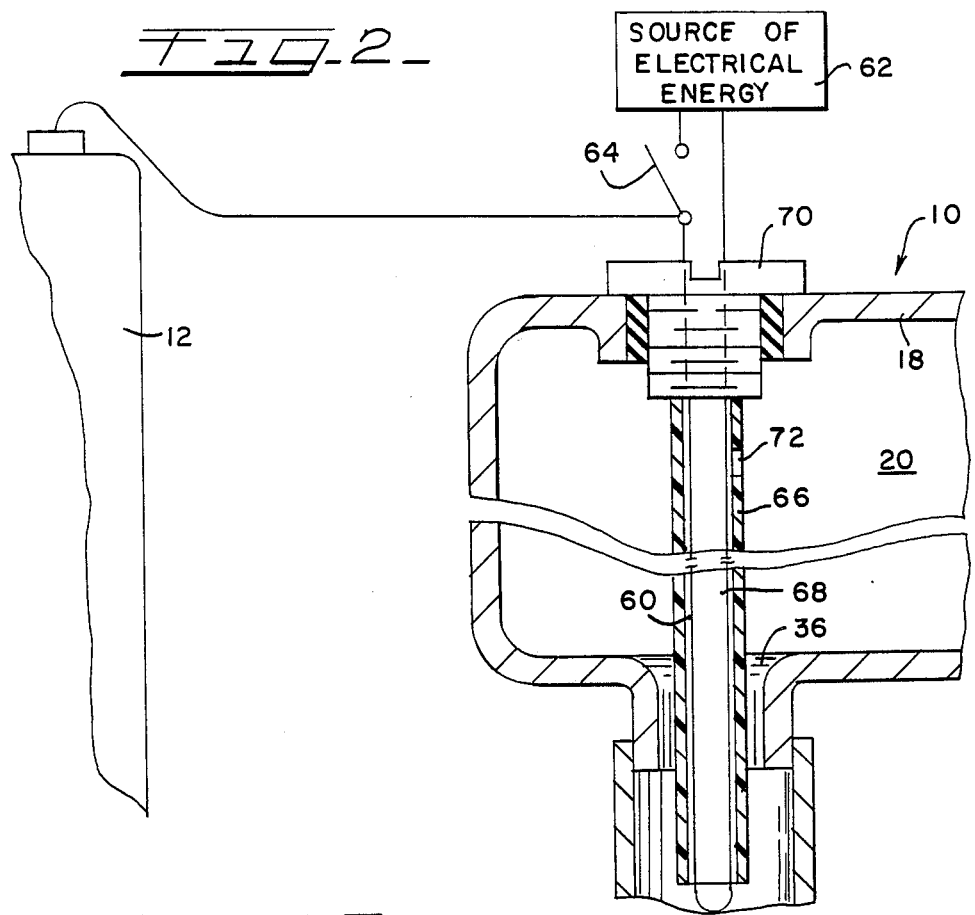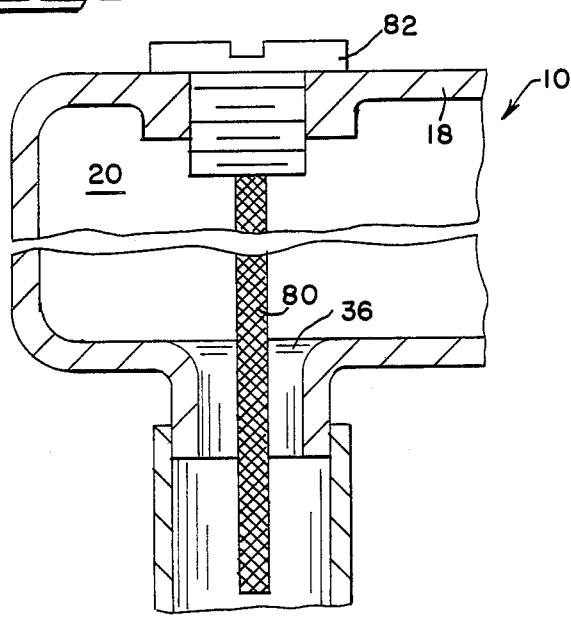

4,757,718

DE-ICER FOR A TRANSDUCER ASSEMBLY

FIELD OF THE INVENTION

The present invention relates to improvements to transducer assemblies especially those used in combination with an exhaust system of an internal combustion engine.

BACKGROUND OF THE INVENTION

Transducer assemblies have been known to be used in combination with internal combustion engines. As shown in U.S. Pat. No. 4,555,952, a transducer may be arranged to receive part of the exhaust gases emitted from the engine. The exhaust gases emitted from the engine can be of very high temperature and include water vapors. On the other hand, the transducer assembly may be disposed remote from the exhaust in an area where it is subject to ambient temperatures.

In cold weather, the water vapors entrained in the exhaust gases and which are received at the inlet or intake port of the transducer assembly liquefy. The water which results often freezes in the intake port in a manner creating complete ice blockage of the inlet port to the transducer assembly. Thus, a problem is created since the exhaust gases cannot communicate with the transducer assembly because of such ice blockage.

SUMMARY OF THE INVENTION

As a solution to the ice blockage problem, the present invention provides means for preventing complete ice blockage of the inlet port of a transducer assembly used in combination with an internal combustion exhaust system regardless of ambient temperature. Depending on the application, such means may include thermally responsive or electrically responsive means which operate as a function of engine performance. Regardless of which embodiment is used, a salient feature of the present invention is the provision of an apparatus for assuring communication between a transducer assembly and the medium which it is designed to monitor.

A specific object of the present invention is to make available a transducer assembly wherein the inlet port thereto will not be completely blocked with ice when the transducer assembly is used in combination with an internal combustion engine exhaust system.

An additional object of the present invention is to provide the transducer assembly with an anti-icing apparatus which can be produced, packaged and sold at comparatively low price.

BRIEF DESCRIPTION OF THE DRAWINGS

Having in mind the above objects and other attendant advantages that would be evident from an understanding of this disclosure, the invention comprises the devices, combination and arrangement of parts as illustrated in the presently preferred forms of the invention which are hereinafter set forth in detail to enable those skilled in the art to readily understand the function, operation, construction and advantages of same when read in conjunction with the accompanying drawings in which:

FIG. 2 is a partial schematic view which shows another embodiment according to the present invention; and FIG. 3 is a schematic view which shows still another embodiment according to the present invention.

DETAILED DESCRIPTION OF THE INVENTION

Figure 1:
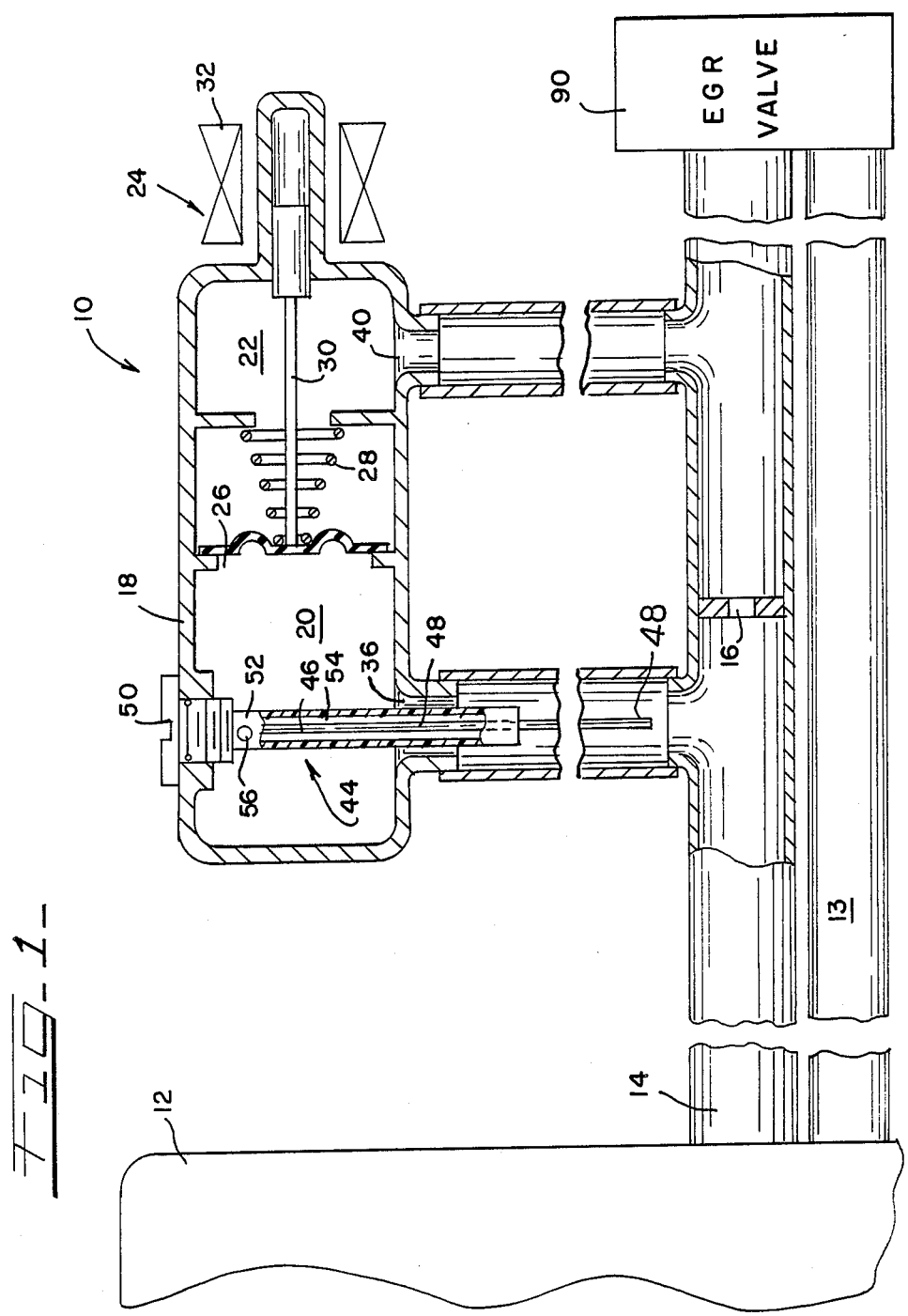
FIG. 1 is a schematic view which illustrates one embodiment according to the present invention.

A transducer assembly 10, embodying the principles of the present invention, is illustrated in FIG. 1. In this embodiment, the transducer assembly 10 is suited for use with an internal combustion engine 12 having an intake passage 13 and an exhaust passage 14 through which exhaust gases emitted from the engine 12 are discharged into the atmosphere. The exhaust passage 14 may be provided with a reduced orifice 16. As is known in the art, the transducer assembly 10 may be used to detect various parameters of engine performance and/or operation.

The transducer assembly 10 has been illustrated in FIG. 1 as a differential transducer assemblage which is carried in the engine compartment of a vehicle. It should be appreciated, however, and as will be subsequently described, the teachings of the present invention extend beyond this particular transducer structure. In the illustrated embodiment, the transducer assembly 10 includes a body or housing 18 with two pressure chambers 20 and 22. The transducer assembly further includes means for detecting pressure changes in said chambers. Such detection means 24 may include a diaphragm operator 26 which is arranged between chambers 20 and 22 in a known manner and is urged into a reference position by a spring 28. An arm or stem 30 has one end connected to the diaphragm operator 26. The opposite end of arm 30 combines with suitable sensing means 32 for detecting a change in pressure in either or both chambers.

The body or housing 18 also includes an inlet passageway or port 36 for normally permitting a part of the engine exhaust gases to pass from the exhaust passage 14 to the transducer assembly. That is, the inlet port or passageway 36 defines a communication path between chamber 20 of the transducer assembly and that part of the exhaust passage 14 disposed on one side of the reduced orifice 16. It should be appreciated, however, that the housing 18 may be disposed remote from the engine exhaust in an area whereat it is subject to ambient temperatures. In the illustrated embodiment, body 18 further includes a second port or passageway 40 for permitting the exhaust gases on the opposite side of the reduced orifice 16 to communicate with chamber 22. The pressure differential across the reduced orifice will be detected by the diaphragm operator resulting in linear displacement of arm 30 which is monitored by sensing means 32 and which may signal a change in the pressure differential between chambers 20 and 22.

As previously noted, in colder ambient temperatures due to the entrainment of water vapor in the exhaust gases and the location of inlet port 36 to the transducer assembly, ice is likely to form in the inlet passage. As such, a problem is created because exhaust gases cannot communicate with the transducer assembly when ice completely blocks the inlet passage. That is, during colder temperatures the inlet passageway leading to the chamber in the transducer assembly may be subject to the formation of ice blockages therein. When ice blocks the inlet, the flow of engine exhaust gases to chambers 20, 22 is also blocked and, thus, an inaccurate indication may be provided by the sensing means 32 since little or no pressure will be created in either or both chambers. The present invention precludes these difficulties by providing means for preventing complete ice blockage in such passageways.

The means for preventing complete ice blockage in an inlet passageway to the transducer assembly may assume various forms. As seen in FIG. 1, and broadly stated, operative means 44 extends at least partially through the inlet passageway 36. In the illustrated embodiment, such operative means includes an elongated heat conducting member 46, such as a copper strip or wire form, which is arranged in the valve body of the transducer assembly. One end of the heat conducting member 46 being disposed in heat conductive relation with the exhaust passage 14. In the illustrated embodiment, the intermediate portion 48 of the strip 46 passes through the inlet passageway 36 while its opposite end may be secured to a closure member 50 received in the valve body. An open ended tubular member 52 or elongated cover may be arranged along and about the heat conducting member 46 to define a passageway 54. Tubular member 52 may also be secured to the closure member 50 or may be located in either chamber of the body or housing by the heat conducting member 46. In its presently preferred form, the tubular member 52 is formed from a TEFLON synthetic resin product. The tubular member 52 may be provided with a radial port 56 near its upper most end to allow gases received at the intake or lower end of the tube 52 to exhaust to chamber 20. The radiant heat provided by the heat conducting member 46 maintains the passageway 54 free from ice blockage. As such, adequate communication may be maintained between exhaust passage 14 and the transducer assembly.

FIG. 2 illustrates a second embodiment of means for preventing complete ice blockage of the inlet port of the transducer assembly. This embodiment includes an electrically operated apparatus operatively coupled to an energy source. More specifically, the apparatus includes an electrically operated, elongated heat generative element 60 which is operatively connected or coupled to a source of electrical energy 62 when the engine is operated. To achieve this end, the ignition swith 64 for operating the engine serves as the operative coupling which completes a circuit between resistance element 60 and the source of electrical energy 62. The heating element 60 may be surrounded by an open ended tubular cover or housing 66 which extends along and about the element 60 to define a heated passageway 68. In its preferred form, cover 66 is formed from a TEFLON synthetic resin product and may be secured to an electrically insulated closure member 70 in the body 18 of the transducer assembly or may be located in the transducer assembly by element 60. The cover 66 and heating element 60 extend at least partially through the inlet aperture or port 36 of the transducer assembly. The cover 66 is provided, at its upper end, with a radial port 72. By such construction, an ice free flow passageway is established whereby permitting continuous communication of exhaust gases to the transducer assembly.

In the embodiment illustrated in FIG. 3, a wicking material 80 is provided in the transducer assembly. The wicking material is preferably a high temperature, braided nylon such as NOMEX nylon manufactured by DuPont which will permit capillary action along its length. One end of such material may be secured to a closure member 82 in the valve body while the other end extends through the inlet passageway 36 of the transducer assembly. As such, the wicking material provides a condensed water drain or passage in the transducer assembly which prevents the formation of a complete ice blockage in passageway 36.

As mentioned above, the salient feature of the present invention is that it is applicable to a myriad of uses. Turning again FIG. 1, the principles of the present invention are illustrated in combination with an exhaust gas recirculation (EGR) valve 90. As seen in the illustration, the EGR valve 90 is conventionally arranged in combination with the engine 12 and is associated with the intake passage 13 and an exhaust passage 16.

From the foregoing, it will be appreciated that the present invention offers a unique assemblage of elements which will prevent the formation of a complete ice blockage in an intake port of a transducer assembly used in combination with an internal combustion engine. Whether such an assembly uses capillary action, thermally or electrically responsive elements, it is effective to permit continued communication of exhaust gases to a pressure chamber of the transducer regardless of temperature whereby assuring proper operation of the transducer assembly.

Thus, having adequately described my invention, what I claim is:

1. A transducer assembly for an internal combustion engine comprising:

a housing position on said engine and having a pressure responsive diaphragm operator disposed in a chamber provided in said housing, an inlet passage for normally permitting engine exhaust gases to flow into said chamber, said inlet passage being disposed at a location where ice is likely to form thereby blocking said passage; and operative means provided in said housing and passing at least partially through said inlet passage for preventing complete ice blockage of said passage regardless of the location of said housing relative to said engine.

2. The transducer assembly according to claim 1 wherein said operative means for preventing complete ice blockage of said passage includes wicking material passing from said chamber and at least partially through said inlet passage.

3. The transducer assembly according to claim 1 wherein said operative means includes an elongated heat conducting member disposed such that it maintains a heat conductive relation with the exhaust gases and extends at least partially through said inlet passage.

4. The transducer assembly according to claim 3 wherein said operative means further includes an elongated cover situated about said heat conducting member in a manner defining a passageway extending at least partially through said inlet passage.

5. The transducer assembly according to claim 1 wherein said operative means includes an electrically operated apparatus which is operably coupled to a source of energy.

6. The transducer assembly according to claim 5 wherein said electrically operated apparatus includes an elongaged heat generating member.

7. A transducer assembly positioned in combination with an internal combustion engine having an exhaust passage, said transducer assembly comprising:

a housing constructed and arranged with suitable passageways permitting engine exhaust gases to pass from said exhaust passage to a chamber in said housing, said passageways being subject to the formation of ice blockage therein; and operative means disposed in at least one of said passageways for maintaining that passageway free of complete ice blockage regardless of the location of said housing relative to said exhaust passage.

8. The transducer assembly according to claim 7 wherein said operative means includes capillary means disposed for draining condensated water from said chamber.

9. The transducer assembly according to claim 7 wherein said operative means includes at least one elongated heat conducting member disposed such that one end of said heat conducting member is in heat exchanging relation with said exhaust passage and extends into such chamber.

10. The transducer assembly according to claim 9 wherein said operative means further includes an elongated cover arranged about said heat conducting member in a manner defining a passageway open to said exhaust passage and said chamber.

11. The transducer assembly according to claim 7 wherein said operative means includes at least one electrical heating element disposed in one of said passageways to maintain said passageway free of complete ice blockage.

12. The transducer assembly of claim 11 wherein said electrical heating element is coupled to a source of electrical energy when said engine is operated.

13. A transducer assembly position in combination with an internal combustion engine having an exhaust passage through which exhaust gases flow when said engine is operated, said transducer assembly comprising:
- a housing having a chamber, an inlet passage for normally permitting engine exhaust gases to flow into said chamber from said exhaust passage but which is disposed at a location where ice is likely to form thereby blocking said passage, and means for sensing fluid pressure in said chamber; and
- means carried by said housing and passing at least partially through said inlet passage for preventing complete ice blockage of said passage regardless of the location of said inlet passage relative to said exhaust passage.

14. The transducer assembly to claim 13 wherein said means for preventing complete ice blockage of said passage includes capillary means disposed in said passage for draining water from said chamber.

15. The transducer assembly according to claim 13 wherein said means for preventing complete ice blockage of said passage includes an elongaged heat conducting member having one end arranged in heat conducting relation with the exhaust passage and which extends at least partially through said inlet passage.

16. The transducer assembly according to claim 15 wherein said means for preventing complete ice blockage of said passage further includes an elongated cover arranged about said heat conducting member to define an open passage extending through said inlet passage.

17. The transducer assembly according to claim 15 wherein said means for preventing complete ice blockage of said passage further includes an elongated cover arranged about and located by said heat conducting member.

18. The transducer assembly according to claim 13 wherein said means for preventing complete ice blockage of said passage includes an electrical heating element operatively coupled to a source of electrical energy.

19. The transducer assembly according to claim 18 wherein said means for preventing complete ice blockage of said passage further includes a hollow cover arranged along and about said heating element, the interior of said cover defining a passageway extending from said chamber and at least partially through said passage.

20. A transducer assembly positioned in combination with an internal combustion engine having an exhaust passage through which exhaust gases flow when said engine is operated, said transducer assembly comprising:
- a housing having a chamber, an inlet passage for normally permitting engine exhaust gases to flow into said chamber from said exhaust passage but which is disposed at a location where ice is likely to form thereby blocking said passage, and means for detecting a fluid pressure in said chamber; and
- a heat conducting assemblage extending through said inlet passage a sufficient distance to establish a flow passageway which permits a continuous flow of said exhaust gas with said chamber.

21. The transducer assembly according to claim 20 wherein said heat conducting assemblage includes an elongated heat conducting member one end of which is disposed in heat exchange relation with said exhaust passage and extends into said chamber.

22. The transducer assembly according to claim 21 wherein said heat conducting assemblage further includes an elongated cover which extends about and along said heat conducting member.

23. The transducer assembly according to claim 20 wherein said heat conducting assemblage includes an electrical heat generative apparatus which is connectable to a source of electrical energy when said engine is operated.

24. The transducer assembly according to claim 23 wherein said heat conducting assemblage further includes an elongated cover which extends along and about said apparatus.

25. Apparatus for preventing the formation of ice blockage in an intake port of a transducer assembly in which engine exhaust gases are received in a pressure chamber through said intake port, said apparatus comprising:
- an elongated electrical heating element having a cover extending across and along at least a portion of the heating element's length to define a heated passage when said heating element is connected to a source of electrical energy, said heated passage extending through said intake port a sufficient distance to establish a gaseous flow passageway which permits continuous communication of said exhaust gases with said pressure chamber.

* * * * *

UNITED STATES PATENT AND TRADEMARK OFFICE
CERTIFICATE OF CORRECTION

PATENT NO. :     4,757,718
DATED      :     July 19, 1988
INVENTOR(S) :    Clarence D. Fox It is certified that error appears in the above-identified patent and that said Letters Patent is hereby corrected as shown below:

Column 4, line 26, cancel "position" and insert -- positioned --.

Column 5, line 50, cancel "elongaged" and insert -- elongated --.

Signed and Sealed this

Fourteenth Day of March, 1989

Attest:

DONALD J. QUIGG

*Attesting Officer*   *Commissioner of Patents and Trademarks*